United States Patent [19]

Muka et al.

[11] Patent Number: 4,672,192

[45] Date of Patent: Jun. 9, 1987

[54] LASER LIGHT BEAM NOISE REDUCING APPARATUS

[75] Inventors: Edward Muka; Nea Yea Woo, both of Rochester, N.Y.

[73] Assignee: Eastman Kodak Company, Rochester, N.Y.

[21] Appl. No.: 753,499

[22] Filed: Jul. 10, 1985

[51] Int. Cl.$^4$ .............................. G01J 1/32; H01S 3/13
[52] U.S. Cl. ...................................... 250/205; 372/29; 372/31
[58] Field of Search .................... 250/201 DF, 205; 372/29, 31; 369/44; 346/76 L

[56] References Cited

U.S. PATENT DOCUMENTS

| | | | |
|---|---|---|---|
| 4,071,751 | 1/1978 | Waksberg | 250/201 |
| 4,114,180 | 9/1978 | Kayanuma | 250/205 |
| 4,123,780 | 10/1978 | Honjo | 346/76 L |
| 4,162,398 | 7/1979 | Kayanuma | 250/205 |
| 4,221,960 | 9/1980 | Maeda et al. | 250/205 |
| 4,433,235 | 2/1984 | Akiyama et al. | 250/205 |
| 4,535,431 | 8/1985 | Bricot et al. | 369/44 |
| 4,547,664 | 10/1985 | Vogt et al. | 250/205 |

FOREIGN PATENT DOCUMENTS 0000127  1/1984  Japan .................................. 250/205

OTHER PUBLICATIONS

Alentsev et al, "Acoustooptic Power Stabilizer for a Continuous Laser Beam", 2353 *Measurement Techniques*, vol. 24, No. 8, Aug. 1981, pp. 649-650.

Primary Examiner—David C. Nelms
Assistant Examiner—Charles Wieland
Attorney, Agent, or Firm—Donald D. Schaper

[57] ABSTRACT

Laser beam noise reducing apparatus includes an acoustooptic cell which receives a noisy input laser light beam and produces an undiffracted or zero-order light beam and a diffracted beam in response to an RF signal at a predetermined frequency. The zero-order beam is applied to a utilization device which produces an information modulated output beam at an image zone. The zero-order beam at the output of the acoustooptic cell is sampled and AC and DC component signals are produced which are functions of fast and slow time varying changes, respectively, in the intensity of the zero-order beam. The output beam from the utilization device is sampled when it is unmodulated and a DC reference signal which represents the intensity of the DC component at the image zone is produced. The AC and DC component signals and the reference signal are combined and used to control the amplitude of the RF signal to reduce noise in the beam at the image zone.

5 Claims, 3 Drawing Figures

LASER LIGHT BEAM NOISE REDUCING APPARATUS

FIELD OF THE INVENTION

This invention relates to apparatus for producing a relatively noiseless information modulated laser output light beam.

BACKGROUND OF THE INVENTION

In many optical printing systems the intensity of a laser light beam focused on a two-dimensional photosensitive surface is modulated as the beam is moved relative to such surface to provide a two-dimensional output image. Such systems often use an output scanner which may include a gas laser which produces a beam of light at a predetermined wavelength and a deflector such as a rotating polygon mirror which line scans this light beam. The intensity of this laser light beam is information modulated by an acoustooptic modulator device.

This type of modulator includes a transparent cell which may be made of an acoustooptic material such as glass or TeO$_2$ crystal and a piezoelectric transducer bonded to the cell. An RF signal, usually in the range of 40–300 MHz, is applied to the transducer. The transducer launches acoustic waves in the cell which produces sonic compression waves that create a diffraction wave grating. This diffraction grating causes a portion of the input laser light beam passing through the cell to be diffracted out of its original path. Amplitude changes of the RF signal cause intensity modulation of the diffracted (first-order) and undiffracted (zero-order) beams. The intensity of the modulated diffracted light beam varies in direct proportion to RF signal amplitude. The modulated diffracted light beam, rather than the undiffracted beam, is utilized, e.g. applied to a deflector which converts the information modulated light beam into a line scan.

In some printing applications, it is desirable that noise variations in such input light beam intensity about a desired constant intensity level, be kept on a very low level. For example, with laser color printers there are applications where it is very important that the DC laser power variations at the image zone be kept at less than about ±0.5% from a desired level to prevent banding in prints.

In commonly assigned U.S. patent application Ser. No. 619,453 filed June 11, 1984 to Baldwin et al, a beam intensity controlling apparatus is disclosed which includes an acoustooptic cell which receives a noisy input laser light beam and produces a substantially constant zero-order beam and a first-order light beam in response to an input RF signal at a predetermined frequency. The first-order beam is varied to control the intensity of the zero-order beam. To this end, means respond to the intensity of the zero-order beam to produce an error signal which is a function of the difference in intensity of the zero-order beam from a desired constant intensity level. The difference in intensity of the zero-order beam from the desired constant level intensity beam has two components, a DC component which represents a slow or long term shift changes in the zero-order beam intensity and an AC component which represents faster time varying changes in the zero-order beam intensity. The error signal is provided to adjustable means which cause a change in the amplitude of the RF signal. This in turn changes the intensities of the zero-order and first-order beams so that the zero-order beam is adjusted towards the desired constant intensity. The zero-order beam is then applied as an input to a utilization device.

An advantage of applying the zero-order beam produced by an acoustooptic cell to the utilization device rather than the first-order beam is that the zero-order beam permits highly efficient throughput of laser energy since only a small amount of laser power needs to be diverted to the first-order beam to control beam intensity.

This arrangement provides a significant advance in the art. However, in certain applications it may have problems maintaining variations in the DC component of the output laser beam at the image zone within acceptable tolerances.

SUMMARY OF THE INVENTION

The object of this invention is to substantially reduce AC and DC noise components at the image zone in a laser output beam.

This object is achieved by a laser beam noise reducing apparatus which includes a utilization device which can modulate its output laser light beam at an image zone. The apparatus comprises an acoustooptic cell for receiving a noisy input laser light beam and producing a zero-order beam and a first-order diffracted light beam in response to an input RF signal. Changes in the amplitude of said RF signal cause intensity changes in the diffracted and zero-order beams. The apparatus further includes means for sampling the zero-order beam to produce AC and DC component signals which are functions of fast and slow time varying changes, respectively, in the intensity of the zero-order beam; means for sampling the unmodulated output laser beam of the utilization device to produce a reference signal representing the DC component in the output beam intensity at the image zone; and adjustable means responsive to said AC and DC component error signals and said reference signal for adjusting the amplitude of said RF signal to change the intensity of the zero-order beam to reduce noise in the output beam at the image zone.

A feature of this invention is that it recognizes that AC beam intensity variations at the image zone are substantially caused by noise in the input laser beam and can be measured in the zero-order beam at the output of the acoustooptic cell, while DC beam intensity variations at the image zone are not only in the input beam but also can be caused by the utilization device which information modulates the beam or other system components downstream from the acoustooptic cell.

DESCRIPTION OF THE PREFERRED EMBODIMENTS

Figure 1:
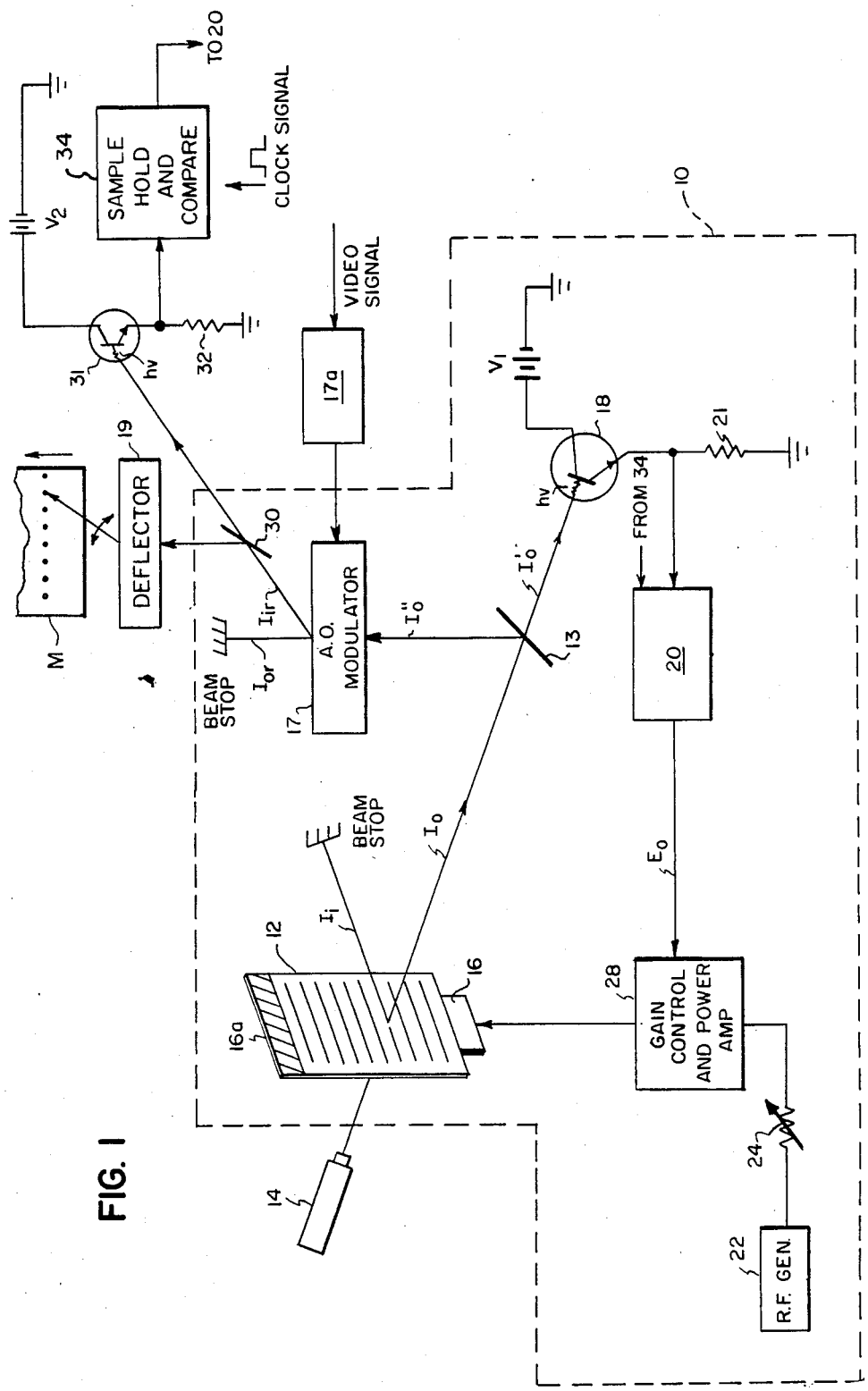
FIG. 1 shows a diagram, partially in block and partially in schematic form of noise reducing apparatus coupled to an output scanner in accordance with the invention.

In FIG. 1, laser noise reducing apparatus 10, in accordance with the present invention, is shown to include a conventional acoustooptic cell 12. The apparatus 10 receives a noisy input laser light beam at a predetermined wavelength from a laser 14. This beam has AC and DC noise components (see FIG. 2). The apparatus 10 delivers a zero-order beam $I_o''$ to an output scanner utilization device which includes an acoustooptic modulator 17 which information modulates the output beam and a deflector 19 that line scans the modulated beam across an image zone. It should be noted that the modulator 17 delivers a modulated first-order output beam $I_{ir}$ to the deflector 19. This output beam $I_{ir}$ has variations in its AC and DC intensity components reduced in accordance with the invention. The deflector 19 which may be, for example, a continuously rotating polygon which line scans the modulated output beam across a moving photosensitive medium M disposed at the image zone. When the output beam $I_{ir}$ is not information modulated by modulator 17, then it should be at the desired intensity shown in FIG. 2.

The acoustooptic cell 12 includes a transparent member formed for example from glass or $TeO_2$ crystal and a piezoelectric transducer 16 bonded to the cell. Apparatus 10 also includes RF generator 22 which provides an electrical signal of a predetermined frequency to the transducer 16, which translates the RF electrical signal into acoustic waves that propagate through the acoustooptic cell. Also bonded to the cell 12 is a conventional acoustic absorber 16a. The acoustic waves launched within the cell correspond to the predetermined frequency of the RF signal and form a phase diffraction grating causing a first-order light beam $I_i$ which passes through the cell to be diffracted out of the zero-order beam $I_o$ to a beam stop.

As will be shortly described, the zero-order beam $I_o$ is sampled to determine the AC component intensity variations in the output beam $I_{ir}$ from a desired constant intensity level. The beam $I_{ir}$ is also sampled to determine DC component intensity level in beam $I_{ir}$ and the beam $I_o$ is sampled to determine the DC component variations at the image zone. The amplitude of the RF signal applied to transducer 16 is adjusted to correct for both AC and DC component errors at the image zone and change the intensity of the output beam at the image zone to reduce noise as will be described later.

The zero-order beam $I_o$ is divided by a beam splitter 13 into two zero-order beams $I_o'$ and $I_o''$. The beam $I_o'$ is a small sample of the zero-order beam $I_o$ and will be used in producing an AC component error signal and a DC component error signal which will be discussed later. The beam $I_o''$ is delivered by the apparatus 10 as an input to the modulator 17.

The modulator 17 may be a conventional single-beam acoustooptic modulator utilization device. A video signal drives a gain control and amplifier 17a which provides a control signal power to the modulator 17 which information modulates the output beam $I_{ir}$ in accordance with information in the video signal. When the output beam $I_{ir}$ is unmodulated, then the power amplifier 17a should provide a control signal to the modulator causing the beam to be at a desired intensity (see FIG. 2).

The modulator 17 produces the first order output laser beam $I_{ir}$ which is diffracted and an undiffracted beam (zero-order beam) $I_{or}$. The deflector 19, which may be a rotating polygon mirror, converts the stationary output light beam $I_{ir}$ to a line scan which is recorded on the moving medium M at the image zone. The zero-order beam $I_{or}$ is applied to a beam stop and is not used for recording. The operation of the modulator 17 and deflectors 19 used in output scanners are well understood in the art. For a more complete description of modulators and deflectors, see Urbach et al, "Laser Scanning for Electronic Printing", *Proceeding of the IEEE*, 597 (June 1982).

A beam splitter 30 divides the beam $I_{ir}$ into two first order beams. A small sample is delivered to a photocell 31 which detects and converts the amplitude of this beam to an electrical voltage signal. This signal is provided at the junction of photocell 31 and a resister 32. This voltage signal is applied to a conventional sample hold and compare circuit 34. This circuit 34 is periodically operated as shown by a clock signal at a time when the unmodulating control signal is being applied to the modulator 17 by the power amplifier 17a. Such a time could conveniently be selected between line scans. This circuit 34 periodically samples and holds the level of the electrical signal which represents the intensity of the $I_{ir}$ beam, then compares it with a fixed DC intensity reference which represents the desired intensity of the DC component and calculates a reference signal for the error signal producing circuit 20. This comparison function could be provided by an operational amplifier. The operation of the circuit 34 can be performed either in a continuous mode or intermittently simply by changing the frequency of the clock signal.

Returning now to the output of the cell 12, the beam splitter 13 divides the zero-order beam $I_o$ into two zero-order beams, $I_o'$ and $I_o''$. Beam $I_o'$ is detected by a photocell 18. Photocell 18 is shown as being biased by a battery $V_1$. The current produced by the photocell 18 contains a component which accurately represents AC variations in the intensity of beam $I_{ir}$ and a component which represents DC variations in intensity of beam $I_{ir}$. Fluctuations in the photocell current cause a varying voltage signal between the photocell 18 and resister 21. This voltage signal is applied to error signal producing circuit 20.

The RF generator 22 which may be a conventional device well understood in the art, produces an electrical signal having a fixed frequency at a predetermined amplitude. The amplitude of this signal is controlled by a network which is shown in FIG. 1 only as a resister 24 for simplicity of illustration. The RF signal is actually impressed upon the transducer 16 through a circuit 28 which includes gain control and power amplifier portions. The circuit 28 receives an error signal $E_o$ from circuit 20. In response to the error signal, the circuit 28 adjusts the amplitude of the RF signal applied to the transducer 16 so that noise in the beam $I_{ir}$ is reduced. The acoustic wavelength of the compression wave launched within the cell 12 corresponds to the fixed frequency electrical signal produced by the RF generator. This causes a diffraction grating which produces the first-order beam $I_i$ with an intensity directly proportional to the amplitude of the RF signal. The acoustic wavelength ($\Lambda$) can be calculated from the following expression $$\Lambda = \frac{v_s}{f_s} \quad (1)$$

wherein $v_s$ is the acoustic velocity in cell 12 and $f_s$ is the RF frequency.

Diffraction in the acoustooptic cell 12 is explained by Robert Alder in an article in the *IEEE Sectrum*, May 1967, pp. 42-55 entitled "Interaction of Light and Sound". The transducer 16 can be designed to have a 50-ohm impedance. The RF electrical signal in the range of 40-300 MHz is applied to the transducer. The transducer launches acoustic waves which produce a diffraction grating. The amplitude of the RF signal is adjusted by the gain control circuit 28. Peak-to-peak voltages of the RF signal applied to the transducer 16 are in a range of about 2-3 volts. The error signal $E_o$ produced by circuit 20 is used to adjust the gain control portion of circuit 28 which amplitude modulates the RF signal to give rise to intensity changes in the zero and first-order beams.

Figure 2:
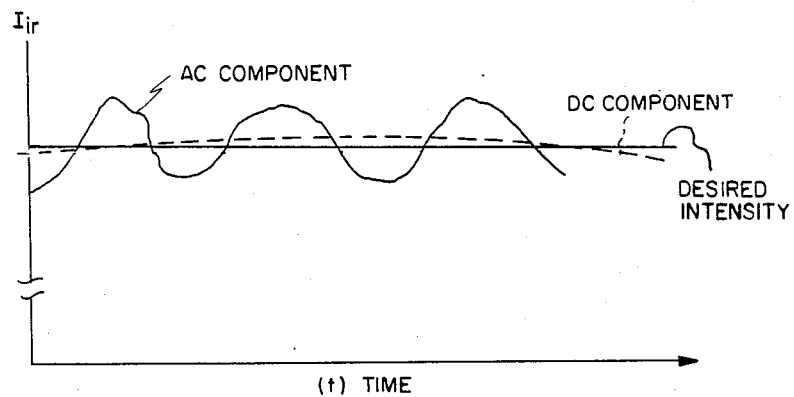
FIG. 2 is a graph of the intensity of the light beam delivered to the deflector of FIG. 1, showing that the intensity of such beam includes AC and DC noise components.

Turning now to FIG. 2, we see a graphical representation of variations in the intensity of the output light beam $I_{ir}$ before the deflector 19. Since the deflector 19 does not distort the output beam, this representation also represents the intensity of the output beam at the image zone. The intensity of this light beam as discussed above has two noise components, a DC component shown as a dotted line which follows the slow drift of changes of the beam intensity and an AC component which is the faster time variations in the beam intensity. The AC beam intensity variations at the image zone are substantially caused by noise in the input beam produced by the laser 14. The DC beam intensity variations at the image zone are caused not only by the input beam but also by other system components downstream of the cell 12. The acoustooptic modulator 17 can be a source of DC noise.

The delay time of cell 12 limits the high frequencies over which corrections due to changes in the AC component can be made. The delay time of the cell 12 results from the propagation time of an acoustic wave within the cell 12 to the beam position within the cell. A typical delay time in a $TeO_2$ crystal with a beam located 300μ from the transducer 16 would result in about 0.07 microseconds delay. Typically, intensity variations at AC component frequencies over about 1 MHz cannot be corrected.

Figure 3:
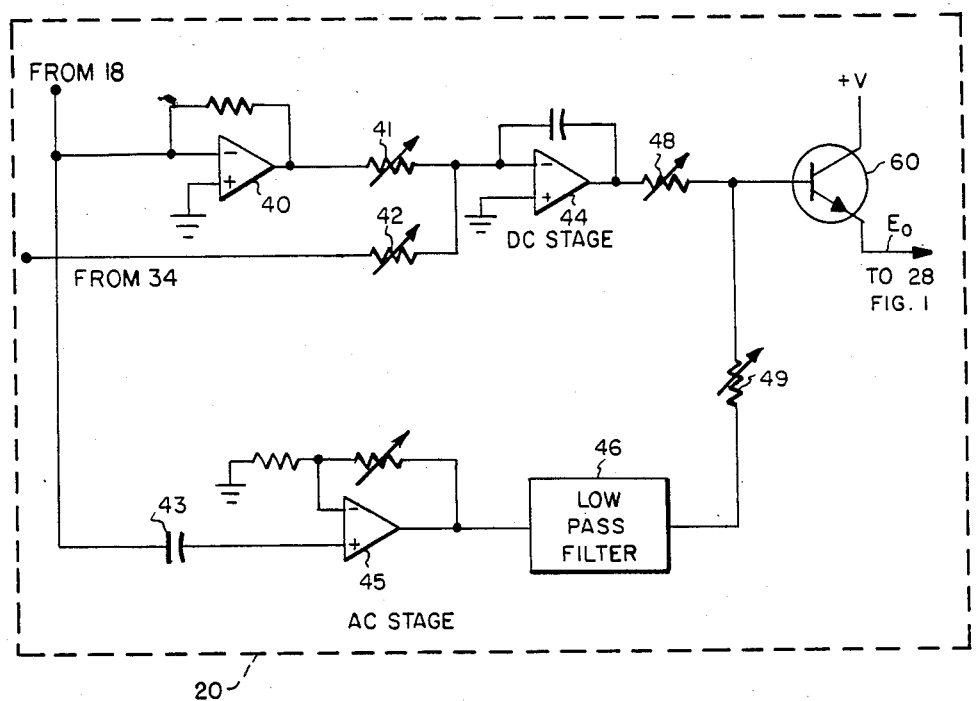
FIG. 3 is a detailed schematic diagram of portions of the circuit 20 of FIG. 1.

As shown in FIG. 3, the error signal producing circuit 20 actually consists of two separate stages, a DC stage and an AC stage. The DC stage produces the DC component of the error signal corresponding to difference between the output beam (without modulation) DC intensity component and a desired constant intensity level and the AC stage produces the AC component of the error signal for minimizing the output beam AC intensity component.

A voltage signal produced at the junction of photocell 18 and resister 21 is applied as an input to both the AC and DC stages. The DC voltage component has low frequency constituents and the AC voltage component has higher frequency time varying constituents. The DC stage is adapted to compare the reference voltage signal from the circuit 34 to an output from an inverter 40 and feedback a DC component of the error sign $E_o$ to the gain control and power amplifier 28 in order to maintain a long term average intensity of the beam $I_{ir}$ at the desired intensity level. The DC stage corrects for slow drifts of the beam intensity while the AC stage minimizes higher frequency changes. The AC stage preferably has 40 db gain at low frequency up to about 10 KHz. When the frequency increases above about 10 KHz, the gain decreases at 20 db per decade to 0 db at about 1 MHz. Because of the delay time in acoustic wave propagation, correction cannot be made for high frequency changes (greater than 1 MHz) in the intensity of beam $I_o$".

As shown in FIG. 3, the DC stage of circuit 20 includes an inverter 40. The output signal of inverter 40 is applied through an adjustable resister 41 to the inverting input of an operational amplifier of an integrator 44. The reference voltage signal from circuit 34 is applied through adjustable resister 42, to the inverting input of the operational amplifier. By adjusting the resistance of the resisters 41 and 42, the output DC beam component intensity level can be adjusted. The integrator 44 produces a DC component error signal which represents the negative of the difference in the DC intensity component from the desired intensity level. The frequency response of the integrator 44 can be adjusted by changing its capacitor and/or input resistance. The output signal of integrator 44 is applied to a summing resister 48.

The AC stage of circuit 20 includes a coupling capacitor 43 which permits only the AC component of the voltage signal from photocell 18 to be delivered to the noninverting input of a variable gain amplifier 45. A low pass filter 46 receives the output of the amplifier 45. For frequency constituents above 10 KHz, the filter gain gradually decreases until about 1 MHz it is about 0 db. The AC component error signal of filter 46 is applied to a summing resister 49. The summing resisters 48 and 49 combine both AC and DC component error signals and apply them to an output buffer amplifier 60. Amplifier 60 produces the error signal $E_o$ which is fed back to the gain control portion of circuit 28. Circuit 28 adjusts the amplitude of the RF signal to thereby change the intensity of the beam $I_{ir}$ to reduce noise at the image zone.

The invention has been described in detail with particular reference to certain preferred embodiments thereof, but it will be understood that variations and modifications can be effected within the spirit and scope of the invention.

We claim:

1. Apparatus for reducing noise in a laser light beam, said apparatus comprising:

an acoustooptic cell for receiving an input laser light beam and for producing a zero-order beam and a first-order diffracted beam in response to an input RF signal;

a utilization device for receiving said zero-order beam and for selectively producing an information-modulated output beam and an unmodulated output beam;

means for producing an electrical signal which is a function of time-varying changes in the intensity of the zero-order beam;

means for sampling the unmodulated output beam from the utilization device and for producing a reference signal representing the instantaneous intensity thereof; and adjustable means responsive to said electriccal signal and said reference signal for adjusting the amplitude of said RF signal to maintain the intensity of said zero-order beam substantially constant and thereby reduce noise in the information-modulated output beam from said utilization device.

2. Apparatus, as defined in claim 1, wherein said electrical signal includes and AC component and a DC component.

3. Apparatus, as defined in claim 2, wherein said reference signal is a DC signal.

4. Apparatus, as defined in claim 3, wherein said sampling means includes a sample, hold, and compare circuit for producing said reference signal.

5. Apparatus, as defined in claim 3, wherein said adjustable means includes means responsive to said AC component for producing an AC error signal, and means responsive to said DC component and to said reference signal for producing a DC error signal.

* * * * *